US012566248B2

(12) United States Patent
Cerqueira Pinto et al.

(10) Patent No.: US 12,566,248 B2
(45) Date of Patent: Mar. 3, 2026

(54) VEHICULAR RADAR SYSTEM WITH OVERLAPPING FIELDS OF SENSING AND AZIMUTH MISALIGNMENT CORRECTION

(71) Applicant: Magna Electronics Inc., Auburn Hills, MI (US)

(72) Inventors: Samuel Cerqueira Pinto, Medfield, MA (US); Ashesh Goswami, Somerville, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 292 days.

(21) Appl. No.: 18/458,393

(22) Filed: Aug. 30, 2023

(65) Prior Publication Data

US 2024/0077582 A1     Mar. 7, 2024

Related U.S. Application Data

(60) Provisional application No. 63/374,039, filed on Aug. 31, 2022.

(51) Int. Cl.
*G01S 7/40*          (2006.01)
*G01S 7/02*          (2006.01)
*G01S 13/931*          (2020.01)

(52) U.S. Cl.
CPC ............ *G01S 7/4004* (2013.01); *G01S 7/023* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,354 | B2 | 2/2004 | Sze |
| 6,710,770 | B2 | 3/2004 | Tomasi et al. |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,304,602 | B2 * | 12/2007 | Shinagawa ........... G01S 7/4026 342/146 |

(Continued)

*Primary Examiner* — Bernarr E Gregory
(74) *Attorney, Agent, or Firm* — HONIGMAN LLP

(57)          ABSTRACT

A method for calibrating a vehicular radar sensing system includes providing a plurality of radar sensors at a vehicle that includes a first radar sensor and a second radar sensor, the first radar sensor having a field of sensing that at least partially overlaps a field of sensing of the second radar sensor. An object in the field of sensing of the first radar sensor is detected via processing sensor data captured by the first radar sensor. The object in the field of sensing of the second radar sensor is detected via processing sensor data captured by the second radar sensor. Based on detection of the object with the first radar sensor and with the second radar sensor, a detection error is determined. Calibration of the second radar sensor is adjusted based on the detection error.

18 Claims, 5 Drawing Sheets

(56)           References Cited

U.S. PATENT DOCUMENTS

| | | | |
|---|---|---|---|
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,126,525 B2 | 9/2015 | Lynam et al. | |
| 9,146,898 B2 | 9/2015 | Ihlenburg et al. | |
| 9,500,742 B2 * | 11/2016 | Poiger | G01S 13/931 |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 9,869,762 B1 | 1/2018 | Alland et al. | |
| 9,954,955 B2 | 4/2018 | Davis et al. | |
| 10,239,446 B2 | 3/2019 | May et al. | |
| 10,534,081 B2 | 1/2020 | Wodrich | |
| 10,866,306 B2 | 12/2020 | Maher et al. | |
| 2006/0132357 A1 * | 6/2006 | Pozgay | G01S 7/4004 |
| | | | 342/174 |
| 2006/0220951 A1 * | 10/2006 | Thome | G01S 13/87 |
| | | | 342/174 |
| 2010/0245066 A1 | 9/2010 | Sarioglu et al. | |
| 2016/0187466 A1 * | 6/2016 | Kim | G01S 13/931 |
| | | | 342/59 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0231635 A1 | 8/2018 | Woehlte | |
| 2019/0187250 A1 * | 6/2019 | Ru | G01S 7/4052 |
| 2019/0339382 A1 | 11/2019 | Hess et al. | |

* cited by examiner

VEHICULAR RADAR SYSTEM WITH OVERLAPPING FIELDS OF SENSING AND AZIMUTH MISALIGNMENT CORRECTION

CROSS REFERENCE TO RELATED APPLICATION

The present application claims the filing benefits of U.S. provisional application Ser. No. 63/374,039, filed Aug. 31, 2022, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A method for calibrating a vehicular radar sensing system includes providing a plurality of radar sensors at a vehicle. The plurality of radar sensors includes at least a first radar sensor and a second radar sensor. A field of sensing of the first radar sensor at least partially overlaps a field of sensing of the second radar sensor. The method includes processing, at a data processor, sensor data captured by the first radar sensor and sensor data captured by the second radar sensor. The method includes detecting, via processing at the data processor of sensor data captured by the first radar sensor, an object in the field of sensing of the first radar sensor. The method also includes detecting, via processing at the data processor of sensor data captured by the second radar sensor, the object in the field of sensing of the second radar sensor. The method includes determining, based on detection of the object via processing at the data processor of sensor data captured by the first radar sensor and via processing at the data processor of sensor data captured by the second radar sensor, a detection error of the second radar sensor relative to the first radar sensor. The method also includes adjusting calibration of the second radar sensor based on the detection error These and other objects, advantages, purposes and features of the present invention will become apparent upon review of the following specification in conjunction with the drawings.

DESCRIPTION OF THE PREFERRED EMBODIMENTS

Figure 1:
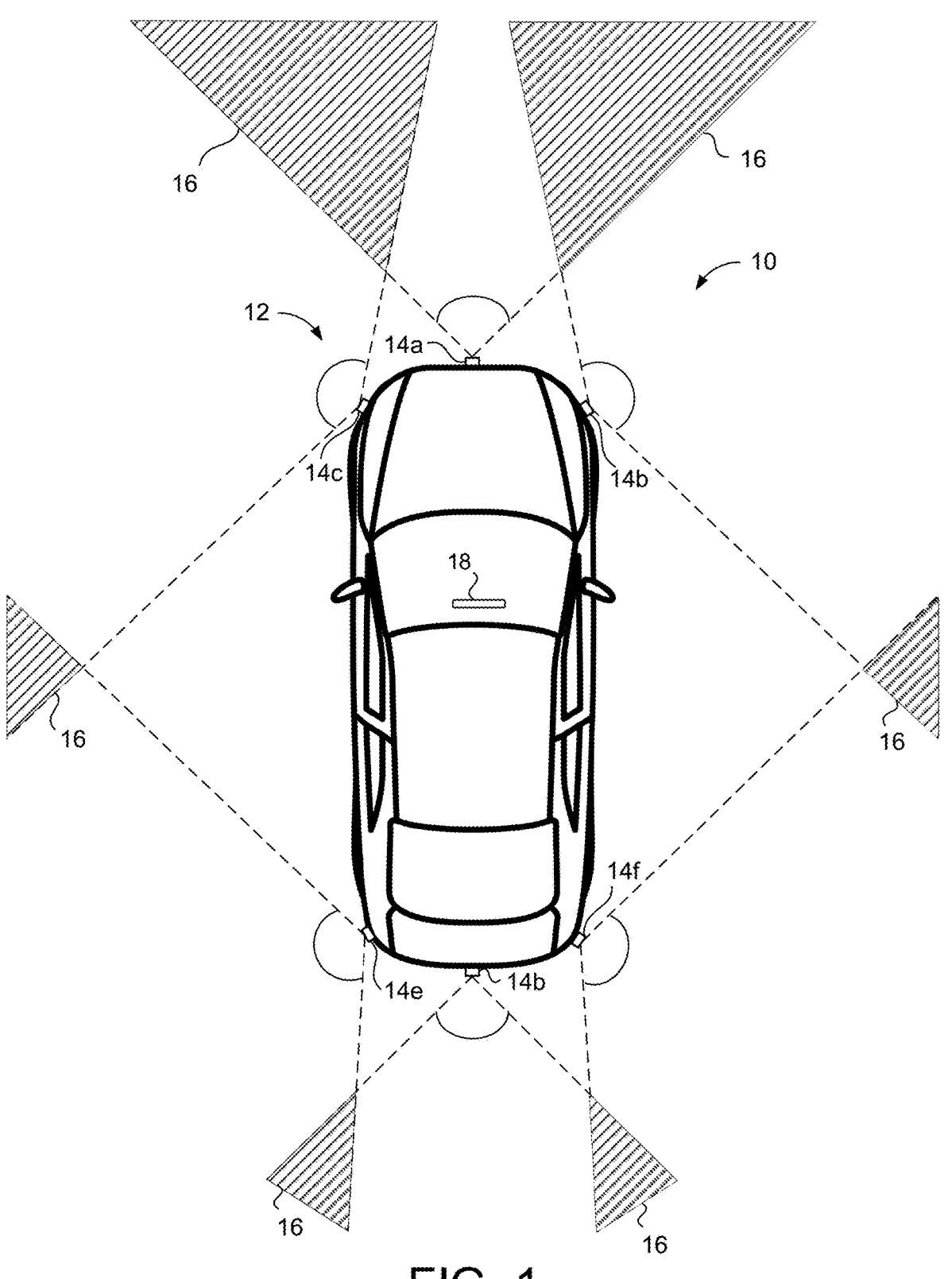
FIG. 1 is a plan view of a vehicle equipped with a sensing system that incorporates a plurality of radar sensors.

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Referring now to the drawings and the illustrative embodiments depicted therein, a vehicle 10 (FIG. 1) includes an driving assistance system or sensing system 12 that includes at least one radar sensor unit, such as front radar sensor unit 14a, a rear radar sensor unit 14b, and/or corner radar sensors 14c-f (and any combination thereof) which sense regions exterior of the vehicle. The system may optionally include multiple exterior facing sensors, such as cameras, radar, lidar, or other sensors, such as sideward facing sensor(s) at respective sides of the vehicle. The sensing system 12 includes a control or electronic control unit (ECU) 16 that includes a data processor that is operable to process data captured by the radar sensor(s). Each radar sensor may include a plurality of transmitters that transmit radio signals via a plurality of antennas. Each radar sensor may also include a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controlling at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Most advanced driver assistance system (ADAS) features need the capability to perceive the environment in order to be able to plan actions for the vehicle. One popular sensor is a radar sensor due to the relatively low cost and reliability in adverse weather conditions, such as fog, rain, and snow. While basic ADAS features may use single radar sensor configurations, more advanced features may require greater perception (e.g., 360 degrees around the vehicle) and thus, multiple radar sensors must be used.

Implementations herein include a sensor or sensing system or radar azimuth calibration system for a vehicle with multiple radar sensors with at least partially overlapping fields of sensing. That is, every radar sensor has at least some coverage region or sensing region that is also covered or sensed by at least one other radar sensor (FIG. 1). The system uses these overlapping fields of sensing to establish radar-to-radar azimuth calibration. The system may also use movement of the vehicle to generate radar-to-vehicle calibration. The vehicle may include any number of radar sensors 14. For example, the vehicle may include four radar sensors (e.g., one at each corner of the vehicle), five radar sensors (e.g., one at each corner of the vehicle and at the front of the vehicle/rear of the vehicle), or six radar sensors (e.g., one at each corner of the vehicle, one at the front of the vehicle, and one at the rear of the vehicle), or more (e.g., sensors at the front, rear, and sides of the vehicle). The radar sensors 14 have a field of sensing that creates overlapping zones 16 where the field of sensing of two or more radar sensors 14 overlap.

Figure 2:
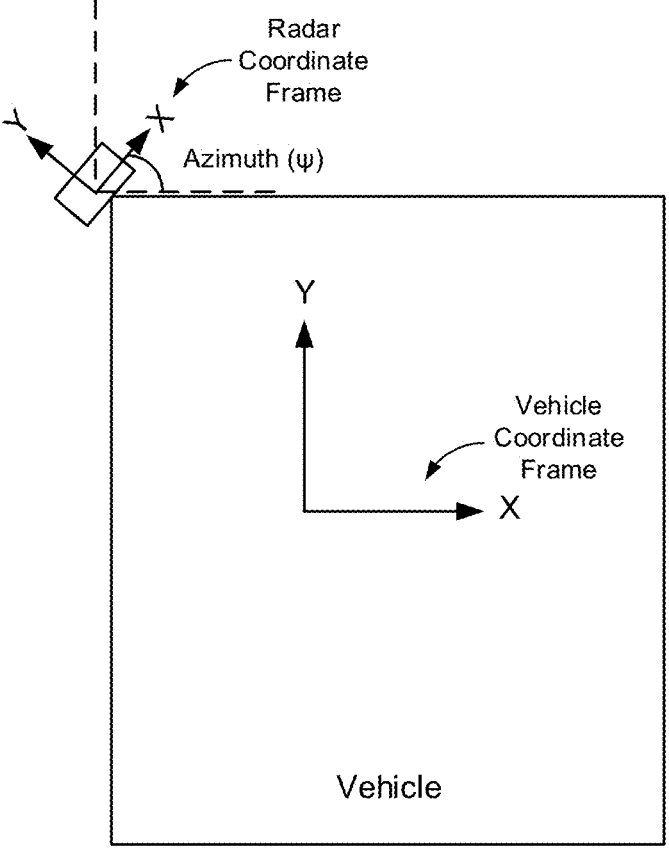
FIG. 2 is a schematic view of a radar coordinate frame and a vehicle coordinate frame.

Referring now to FIG. 2, the azimuth angle corresponds to the rotation between the radar coordinate frame and the vehicle coordinate frame when both are looked at from a top-down view. The system performs calibration online, i.e., while the vehicle is in operation. This is particularly useful because radar calibration often drifts over time due to changes in the mounting support from both natural wearing of the vehicle due to usage and/or incidents such as accidents.

When mounted on a vehicle, the actual position/angle of a radar sensor typically differs slightly from the planned (nominal) position/angle due to imperfections in the mounting process and/or imperfections in the radar sensor/vehicle. Also, over time, through the usage of the vehicle, the directions that the radar sensor points vary with time (i.e., the field of sensing varies with time). In some scenarios, a crash or other significant impact can significantly change the position/angle of the radar sensor. When the radar's position and orientation is not the one expected by the perception software, the perception software may perceive the position of obstacles incorrectly (e.g., in the wrong location relative to the vehicle), leading to inaccuracies in position and velocity estimates as well as other artifacts, for example, "ghost" objects (i.e., objects perceived by the vehicle that do not exist in at that location in reality) or missing actual objects. Among the mounting positions and angle, the azimuth is particularly important because even a small deviation may substantially affect the perceived position of obstacles distant from the vehicle (especially at longer distances).

For "far" objects (i.e., objects not in the near vicinity of the equipped vehicle, such as objects more than 50 meters away, more than 100 meters away, etc.), the position of a detected object in the vehicle frame (assuming no roll or elevation misalignment) is given by:

$$x = r\cos(\psi + \theta) + t_x \tag{1}$$

$$y = r\sin(\psi + \theta) + t_y \tag{2}$$

Here, $\psi$ represents the yaw angle of the radar sensor in the radar coordinate frame, which, as shown in FIG. 2, represents the coordinate frame with respect to the radar sensor. The variable $\theta$ represents the detection azimuth in the radar coordinate frame, $r$ represents the detection range, and $t_x$, $t_y$ represent the translations between the vehicle coordinate frame and the radar coordinate frame along the x and y directions respectively. Thus, the effect of the misalignment in the yaw angle (i.e., the azimuth) is multiplied by the range. Therefore, for detections far away (e.g., greater than 100 m), even a small deviation of less than a degree in the azimuth may have impacts in the order of meters in the perceived position of the detected object.

As discussed in more detail below, radar-to-radar azimuth calibration of the system consists of determining the calibration of a select one of the radar sensors (using the assumption that another radar sensor with at least a partially overlapping field of sensing has a fixed calibration) such that objects detected by both radar sensors overlap or align.

Additionally, the system may perform radar-to-vehicle calibration by orienting the radar sensor in such a way that objects detected by the radar are also aligned with the frame of reference of the vehicle (i.e., longitudinal and lateral relative to the vehicle).

The system establishes radar-to-vehicle calibration for all the radar sensors using two steps. In the first step, one of the radar sensors is selected and assumed to be already calibrated and the other radar sensors that have a field of sensing that at least partially overlaps the selected radar sensor are calibrated using radar-to-radar calibration. After radar-to-radar calibration is achieved, the system generates a single misalignment value to calibrate all the radar sensors with respect to the vehicle.

In order to perform the radar-to-radar calibration, the system performs the following steps. First, the system assumes the vehicle has N radar sensors and that one of the radar sensors (i.e., the lead radar sensor) is calibrated. The system then aligns the remaining radar sensors with respect to the lead radar sensor. The choice of the lead radar sensor is arbitrary, and every radar sensor must have an at least partially overlapping field of sensing with at least one other radar sensor. That is, each of the radar sensors may be connected (via overlapping fields of sensing) with at least one other radar sensor. The output of the radar-to-radar calibration is a vector of misalignment azimuth angles $[\delta_1, \ldots, \delta_{N-1}]$ reflecting the calibration with respect to the radar sensor number N.

Figure 3:
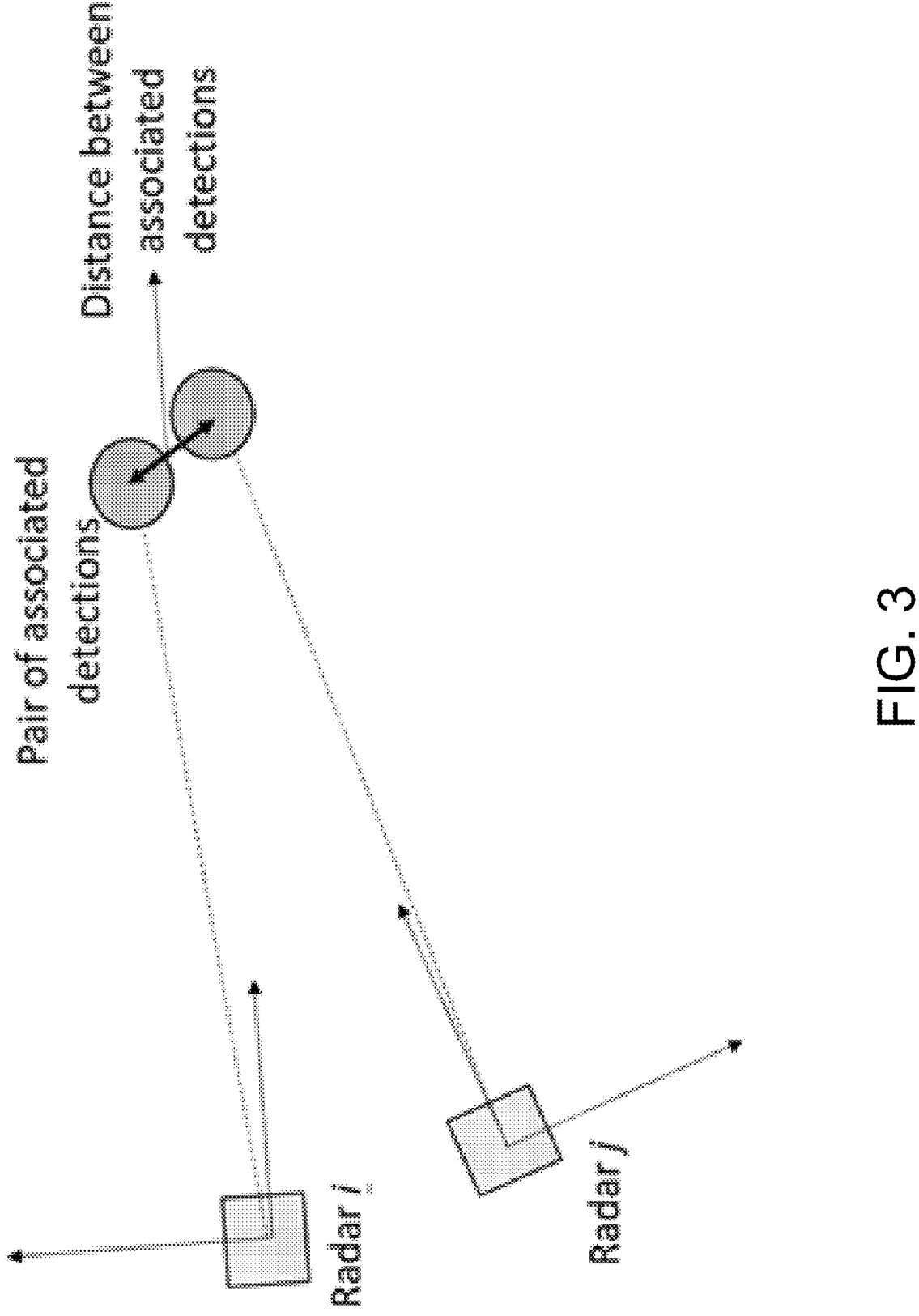
FIG. 3 is a schematic view of a pair of radar sensors with overlapping fields of sensing detecting a pair of objects.

Referring now to FIG. 3, a pair of detected objects is deemed valid for radar-to-radar calibration procedure when the pair of objects are detected within the overlapping field of sensing of the radar sensors i and j and if (i) the x and y position of a detected object detected by radar i falls within the overlapping field of sensing of radar sensors i and j according to the nominal calibration and (ii) there is another object detected by the radar sensor j that also falls within the overlapping fields of sensing of radar sensors i and j. Additionally, optionally, the Euclidean distance between the two detected objects, computed according to the nominal calibrations, must be lower than a predetermined threshold $d_{max}$.

Next, the system, for every pair p of valid detections, defines the error of a valid pair of detections between radar sensors i and j as the distance between the detected objects (FIG. 3).

Mathematically, this error is determined by:

$$e_{i,j,p}^2(\delta_i, \delta_j) = (x_{i,p}(\delta_i) - x_{j,p}(\delta_j))^2 + (y_{i,p}(\delta_i) - y_{j,p}(\delta_j))^2 \tag{3}$$

This may be set this up as an optimization procedure, where the cost function is:

$$\sum_{p \text{ in valid pairs}, i, j < N, i \neq j} e_{i,j,p}^2(\delta_i, \delta_j) \tag{4}$$

Each of the optimizations $\delta_i$ may be initialized to zero and updated in an iterative process according to the following equation:

$$\delta_i[k] = \delta_i[k-1] - \frac{\gamma \partial E}{\partial \delta_i}\Big\vert_{\delta_i = \delta_i[k-1]} \tag{5}$$

Here, $\gamma$ is a positive small constant. The iterative process is repeated until the following equation is true:

$$\Sigma_i(\delta_i[k]-\delta_i[k-1])^2 < \epsilon \qquad (6)$$

Here, $\epsilon$ is a positive constant. The final values of $\delta_i$ give the radar-to-radar misalignment.

Figure 4:
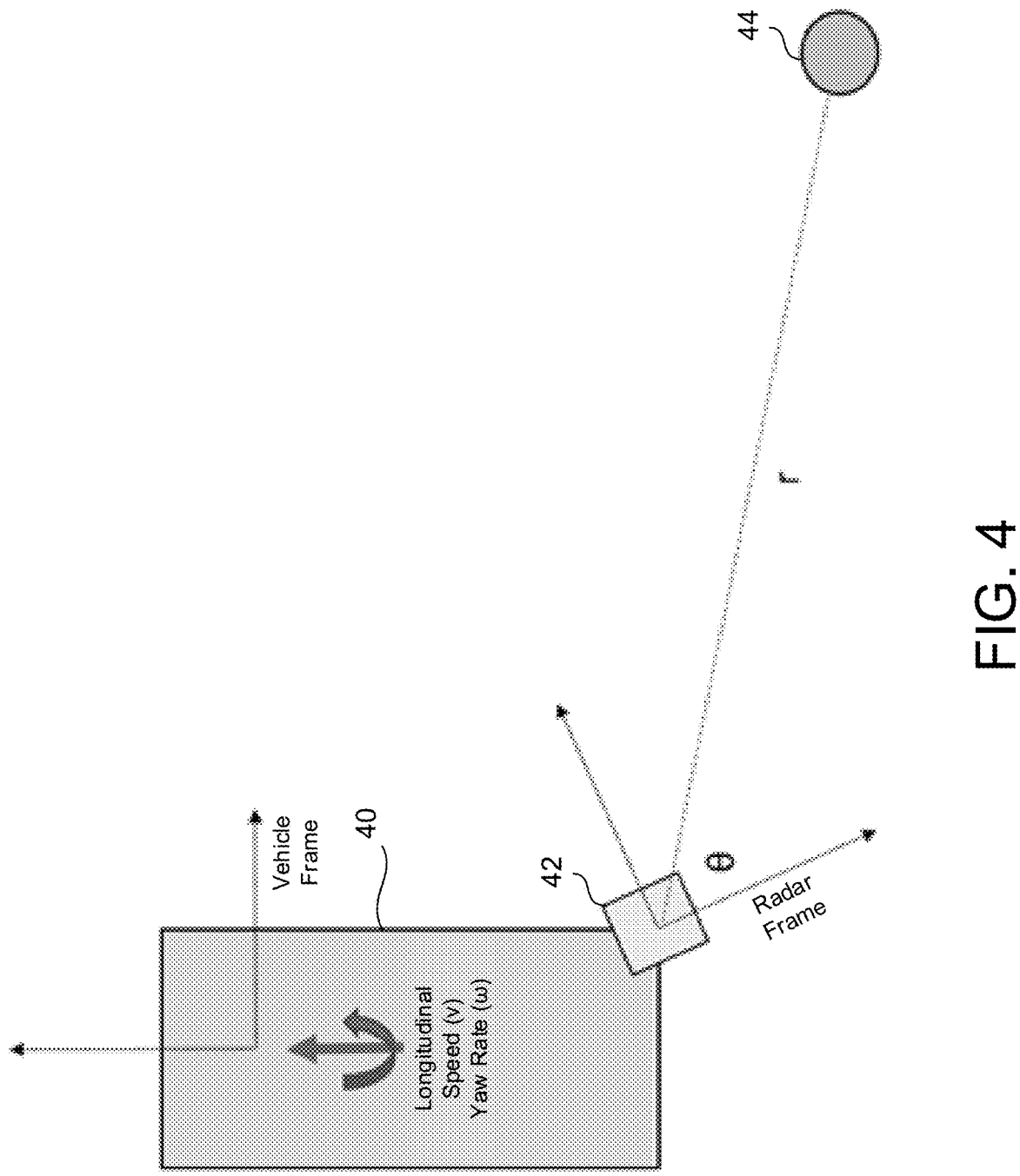
FIG. 4 is a schematic view of a vehicle, a radar sensor, and a static target within a field of sensing of the radar sensor.

The MRR output known as a list of detections is a set of 4D units named detection. Each of these units gives, in the radar frame, the range, Doppler, azimuth, and reflection intensity of a target around the vehicle. The system leverages properties of the Doppler coming from static target detections while the vehicle is moving. FIG. 4 illustrates the relevant frames and variables for the problem. Here, the rectangle 40 represents the vehicle, the square 42 represents the radar sensor and the circle 44 represents the target object (i.e., for detection). Assuming that the target 44 is static in the ground frame (i.e., not moving relative to the ground), the velocity in the radar's frame is $-v_{radar}{}^{ground}$. The Doppler measures the velocity only in the radial direction of the detection. That is, the expected Doppler (d) is:

$$d=-(v_{radar,x}{}^{ground}\cos(\theta)+v_{radar,y}{}^{ground}\sin(\theta)) \qquad (7)$$

Figure 5:
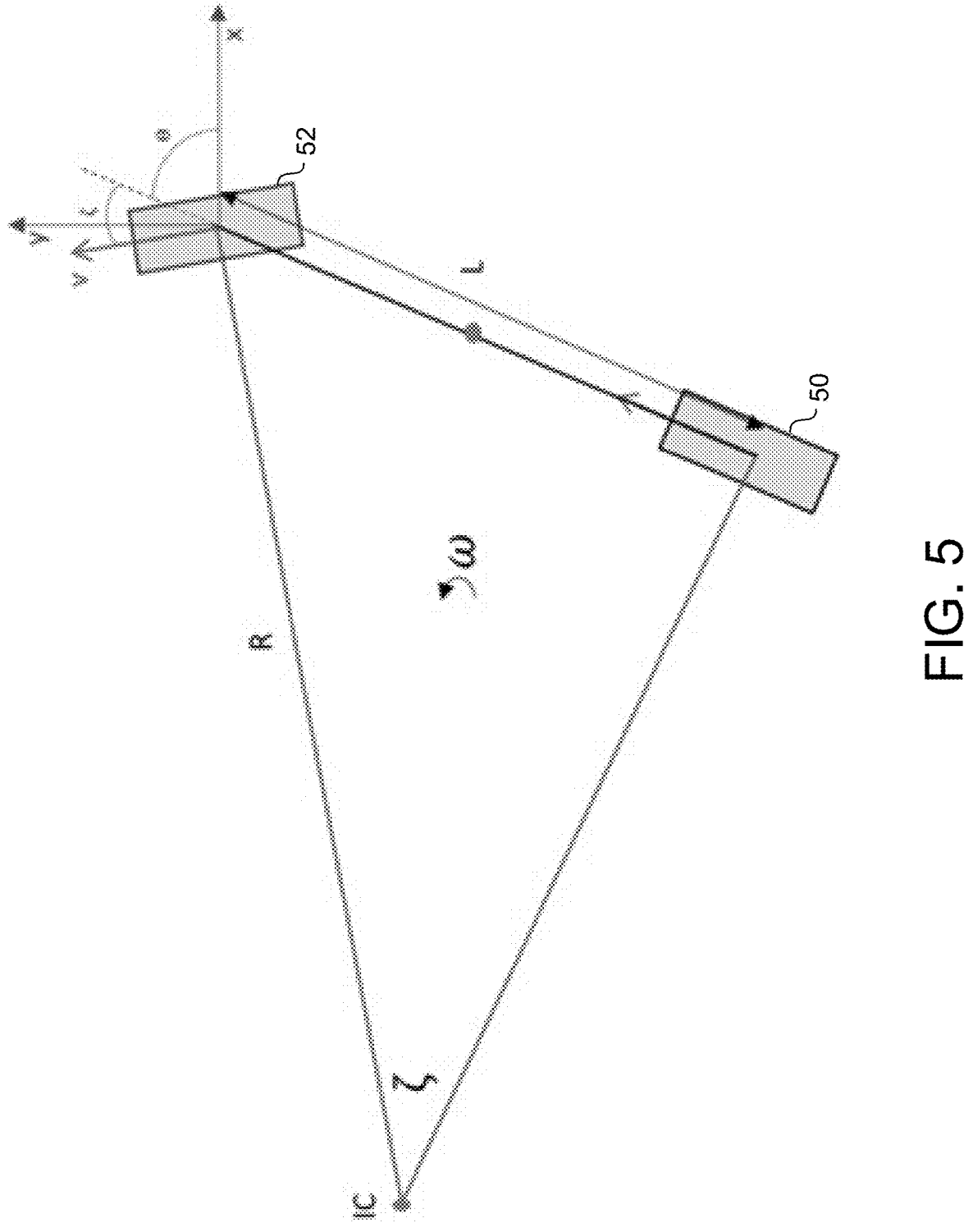
FIG. 5 is a schematic view of kinematics transforming velocity from a vehicle frame into a radar frame.

Thus, when the radar velocity with respect to the ground is known, the system may determine the expected Doppler for static obstacles. However, what is usually known is the vehicle longitudinal speed and vehicle yaw rate in the ground frame. The system must convert the velocity between the vehicle and the radar frame. Using vehicle kinematics, the system may transform the velocity from the vehicle frame into the radar frame. FIG. 5 illustrates such a transformation. Here, a first position 50 and a second position 52 each represent a position within a vehicle. For example, the first position 50 represents the position of the rear axle of the vehicle while the second position 52 represents the position of one of the radar sensors of the vehicle. However, the positions 50, 52 may represent other points of the vehicle.

Using this kinematic model, the system may determine that the ego vehicle velocity (i.e., the velocity of the vehicle represented by its longitudinal component $V_l$ and yaw-rate $\omega$) using the following relations:

$$V_S = \left\| v_{radar}^{ground} \right\| \qquad (8)$$

$$\xi = \tan^{-1}\left(\frac{v_{radar,y}^{ground}}{v_{radar,x}^{ground}}\right) - \psi \qquad (9)$$

$$\omega = \frac{V_s\sin(\xi)}{t_x - \text{wheelbase}} \qquad (10)$$

$$V_l = Vs\cos(\xi) - \omega t_y \qquad (11)$$

Conversely, the radar speed can be computed from the ego vehicle speed using the following set of relations:

$$\xi = \tan^{-1}\left(-\frac{\omega(t_x - \text{wheelbase})}{v_x + t_y\omega}\right) \qquad (12)$$

$$V_s = \frac{V_l + \omega t_y}{\cos(\xi)} \qquad (13)$$

$$v_{radar,x}^{ground} = V_S\cos(\xi + \psi) \qquad (14)$$

$$v_{radar,y}^{ground} = V_S\sin(\xi + \psi) \qquad (15)$$

Both calculations can only be correct when the correct azimuth angle $\psi$ is known. Otherwise, the incorrect azimuth angle will lead to calculating the wrong radar velocity or ego vehicle speed.

Assuming that the system determines the expected Doppler of a static target when the radar velocity is known and the system may transform the vehicle velocity into radar velocity for a given azimuth angle, then the system may perform the radar-to-vehicle calibration procedure by exploring small deviations around the nominal azimuth angle until the system determines the radar velocity such that the measured Doppler best matches the expected one.

To describe the radar-to-vehicle calibration algorithm in more detail, for every radar scan, the system determines whether the ego vehicle longitudinal speed is above a threshold $$v_{min}^{ego}$$

(e.g., greater than 10 km/h, greater than 20 km/h, greater than 30 km/h, etc.). When the ego vehicle speed is too slow, the Doppler (i.e., the change in frequency of a wave in relation to the vehicle moving relative to detected object) on the targets may be small and the measurement noise may be more significant than the Doppler itself. When the speed is above the threshold, the system loops or iterates over all the detected objects to determine whether they are static by computing the difference between the expected Doppler for static targets and the observed Doppler. When the absolute value of such difference is below $\alpha + \beta|d_{observed}|$ (where $\alpha$ and $\beta$ are thresholds to be adjusted), then the system may determine that the detected object is considered static.

For every static detection, the system may loop or iterate over the expected misalignment values, starting from $\Delta\psi_{min}$ ranging to $\Delta\psi_{max}$, in intervals of $\Delta\psi_{intervals}$. For each misalignment value, the system may determine the relative Doppler error $$\frac{|d_{predicted} - d_{observed}|}{|d_{observed}|}.$$

After looping over every detection and every expected misalignment value, the system may return the value that yields the lowest average relative Doppler error. In some examples, this algorithm approximately solves the following optimization problem:

$$\min_{\Delta\psi\in[\Delta\psi_{min},\Delta\psi_{max}]} \sum \text{static detections} \frac{|d_{predicted} - d_{observed}|}{|d_{observed}|} \qquad (16)$$

This search procedure overcomes any issues with non-convexity or stability of the optimization algorithm that can happen when other optimization algorithms are used.

Thus, the sensing system or radar calibration system provides radar-to-radar calibration and radar-to-vehicle calibration of radar sensors disposed at a vehicle. The system performs radar-to-radar calibration by calibrating each radar sensor to a select sensor based on overlapping fields of sensing. The system performs radar-to-vehicle calibration by orienting the radar such that detected objects provided by the radar are also aligned with the vehicle frame of reference.

Azimuth calibration of the radar sensors can be performed during nominal vehicle operations. Because the kinematic model of choice utilizes vehicle yaw rate, the model is a much closer representation of the ego vehicle motion and hence the calibration procedure has no hard requirements on driving maneuvers or static/dynamic environmental factors. Radar-to-radar as well as radar-to-vehicle calibrations may be accomplished using the same procedure, provided the underlying system requirements are met. The system also makes use of an exhaustive search procedure that overcomes problems of non-convexity or stability typically observed with vehicle software deploying run-time optimization algorithms.

The system utilizes radar sensors to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a vehicular radar sensing system, the method comprising:

providing at least two radar sensors at a vehicle, wherein the at least two radar sensors comprise at least a first radar sensor and a second radar sensor, and wherein a field of sensing of the first radar sensor at least partially overlaps a field of sensing of the second radar sensor;

processing, at a data processor, sensor data captured by the first radar sensor and sensor data captured by the second radar sensor;

detecting, via processing at the data processor of sensor data captured by the first radar sensor, an object in the field of sensing of the first radar sensor;

detecting, via processing at the data processor of sensor data captured by the second radar sensor, the object in the field of sensing of the second radar sensor;

determining, based on detection of the object via processing at the data processor of sensor data captured by the first radar sensor and via processing at the data processor of sensor data captured by the second radar sensor, a detection error of the second radar sensor relative to the first radar sensor, wherein determining the detection error comprises determining that a Euclidean distance between a first position of the detected object based on sensor data captured by the first radar sensor and a second position of the detected object based on sensor data captured by the second radar sensor is less than a threshold distance; and adjusting calibration of the second radar sensor based on the detection error.

2. The method of claim 1, wherein the at least two radar sensors comprise a third radar sensor, and wherein the field of sensing of the third radar sensor at least partially overlaps the field of sensing of the second radar sensor, and wherein the method further comprises:

detecting, via processing at the data processor of sensor data captured by the second radar sensor, a second object in the field of sensing of the second radar sensor;

detecting, via processing at the data processor of sensor data captured by the third radar sensor, the second object in the field of sensing of the third radar sensor;

determining, based on detection of the second object via processing at the data processor of the sensor data captured by the second radar sensor and via processing at the data processor of the sensor data captured by the third radar sensor, a second detection error of the third radar sensor relative to the second radar sensor, and wherein determining the second detection error comprises determining that a Euclidean distance between a first position of the second detected object based on sensor data captured by the second radar sensor and a second position of the second detected object based on sensor data captured by the third radar sensor is less than the threshold distance; and adjusting calibration of the third radar sensor based on the second detection error.

3. The method of claim 1, wherein determining the detection error further comprises determining a distance between the first position of the detected object determined via processing at the data processor of the sensor data captured by the first radar sensor and the second position of the detected object determined via processing at the data processor of the sensor data captured by the second radar sensor.

4. The method of claim 1, wherein determining the detection error comprises optimizing a cost function.

5. The method of claim 1, wherein the at least two radar sensors comprises at least a third radar sensor and a fourth radar sensor, and wherein the third radar sensor and the fourth radar sensor are disposed at respective corners of the vehicle.

6. The method of claim 1, wherein the at least two radar sensors comprise six radar sensors.

7. The method of claim 1, wherein determining the detection error of the second radar sensor relative to the first radar sensor occurs during operation of the vehicle by a driver.

8. The method of claim 1, wherein the detection error comprises an azimuth misalignment error.

9. A method for calibrating a vehicular radar sensing system, the method comprising:

providing a radar sensor at a vehicle, the radar sensor having a field of sensing exterior of the vehicle;

detecting, via processing at a data processor of sensor data captured by the radar sensor, an object in the field of sensing of the radar sensor;

determining that the detected object has a velocity of zero relative to the ground;

determining a velocity of the radar sensor relative to the ground;

determining, using the velocity of the radar sensor relative to the ground, an expected Doppler value of the detected object;

determining, via processing at the data processor of sensor data captured by the radar sensor, an actual Doppler value of the detected object;

determining, based on a comparison of the expected Doppler value of the object and the actual Doppler value of the detected object, a misalignment value; and adjusting calibration of the radar sensor based on the determined misalignment value.

10. The method of claim 9, wherein detecting the object is responsive to determining that the vehicle is traveling at a speed greater than a threshold speed.

11. The method of claim 9, wherein the method further comprises determining a Doppler error value based on the comparison of the expected Doppler value of the object and the actual Doppler value of the detected object.

12. The method of claim 11, wherein determining the misalignment value comprises determining, for each misalignment value of a plurality of misalignment values, a respective relative Doppler error.

13. The method of claim 12, wherein the determined misalignment value minimizes the Doppler error value.

14. The method of claim 9, further comprising providing a plurality of radar sensors at the vehicle and adjusting calibration of each radar sensor of the plurality of radar sensors based on the respective determined misalignment value.

15. The method of claim 9, wherein adjusting the calibration of the radar sensor comprises adjusting an azimuth calibration of the radar sensor.

16. A method for calibrating a vehicular radar sensing system, the method comprising:

providing at least two radar sensors at a vehicle;

wherein the at least two radar sensors comprise at least a first radar sensor and a second radar sensor, and wherein a field of sensing of the first radar sensor at least partially overlaps a field of sensing of the second radar sensor;

processing, at a data processor, sensor data captured by the first radar sensor and sensor data captured by the second radar sensor;

detecting, via processing at the data processor of sensor data captured by the first radar sensor and of sensor data captured by the second radar sensor, an object in an overlapping region of the field of sensing of the first radar sensor and the field of sensing of the second radar sensor;

determining, based on detection of the object via processing at the data processor of sensor data captured by the first radar sensor and via processing at the data processor of sensor data captured by the second radar sensor, a detection error of the second radar sensor relative to the first radar sensor, and wherein the detection error is determined based on a distance between a first position of the detected object determined via processing at the data processor of the sensor data captured by the first radar sensor and a second position of the detected object determined via processing at the data processor of the sensor data captured by the second radar sensor, and wherein determining the detection error comprises determining that a Euclidean distance between the first position of the detected object based on sensor data captured by the first radar sensor and the second position of the detected object based on sensor data captured by the second radar sensor is less than a threshold distance; and adjusting azimuth calibration of the second radar sensor based on the detection error.

17. The method of claim 16, wherein determining the detection error comprises optimizing a cost function.

18. The method of claim 16, wherein the at least two radar sensors comprise at least a third radar sensor and a fourth radar sensor, and wherein of the third radar sensor and the fourth radar sensor are disposed at respective corners of the vehicle.

* * * * *